M. P. & M. J. NEUMAYER.
AXLE DRIVEN GENERATOR FOR TRAIN LIGHTING SYSTEMS.
APPLICATION FILED JULY 14, 1916.

1,218,110.

Patented Mar. 6, 1917.
2 SHEETS—SHEET 1.

Inventors:—
Maximilian P. Neumayer
Maximilian J. Neumayer
by J. H. Cornwall
Att'y.

M. P. & M. J. NEUMAYER.
AXLE DRIVEN GENERATOR FOR TRAIN LIGHTING SYSTEMS.
APPLICATION FILED JULY 14, 1916.
1,218,110.
Patented Mar. 6, 1917.
2 SHEETS—SHEET 2.
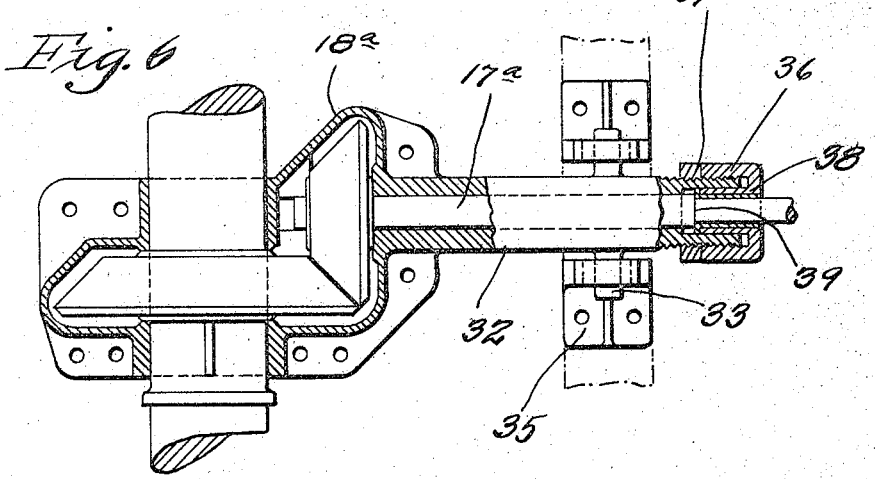
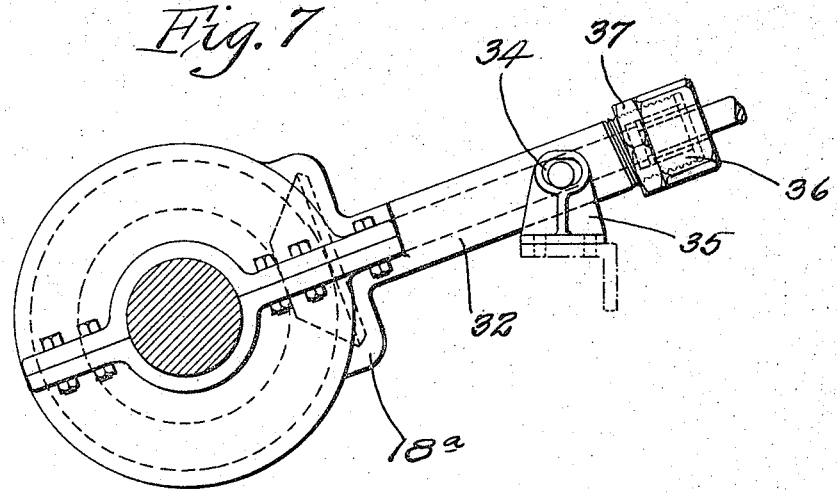
Inventors-
Maximilian P. Neumayer
Maximilian J. Neumayer
by
Att'y.

UNITED STATES PATENT OFFICE.

MAXIMILIAN P. NEUMAYER, OF ST. CHARLES, AND MAXIMILIAN J. NEUMAYER, OF ST. LOUIS, MISSOURI.

AXLE-DRIVEN GENERATOR FOR TRAIN-LIGHTING SYSTEMS.

1,218,110.     Specification of Letters Patent.     Patented Mar. 6, 1917.

Application filed July 14, 1916. Serial No. 109,387.

*To all whom it may concern:*

Be it known that we, MAXIMILIAN P. NEUMAYER and MAXIMILIAN J. NEUMAYER, citizens of the United States, residing, respectively, at St. Charles, Missouri, and St. Louis, Missouri, have invented a certain new and useful Improvement in Axle-Driven Generators for Train-Lighting Systems, of which the following is a full, clear, and exact description, such as will enable others skilled in the art to which it appertains to make and use the same, reference being had to the accompanying drawings, forming part of this specification.

Our invention relates generally to electric lighting systems for trains and more particularly to the generator driving means, which latter is driven from one of the car axles.

In certain of the electric lighting systems for trains now in general use, the dynamo is carried directly upon the truck frame or upon brackets or supports projecting therefrom and said dynamo is driven directly from one of the axles and by means of a belt or chain operating on suitable pulleys or wheels, which latter are fixed on the axle and the armature shaft of the dynamo. This construction has a number of disadvantages, among which may be mentioned the time, labor and expense involved in repairing or renewing the driving belt or chain, which latter wears rapidly and is subject to frequent breakage. Further, where the dynamo is carried directly on the truck frame or upon brackets or supports which project from said truck frame, said dynamo is constantly subjected to vibration and service shocks while the car is in service, with the result that the normal life of the dynamo is materially shortened, thus necessitating frequent repairs and renewal of parts.

It is the purpose of our invention to overcome the objectionable features just mentioned, and further to generally improve upon and simplify the driving means for the generators of train lighting systems now in general use, and to this end, we propose to mount the generator at the logical point, viz., directly upon the car body and to drive said generator from one of the car axles by means of suitable gearing and a shaft which is provided with one or more flexible and extensible joints.

The principal objects of our invention are to provide a comparatively simple and inexpensive generator driving means which can be easily and quickly assembled or taken apart, which is capable of being easily and cheaply repaired and which will operate in the desired manner regardless of the vibration to which it is subjected or to the variation in the relative positions of the generator, the truck frame, and the axle, it being understood that all of these parts have independent vertical and horizontal movement.

With the foregoing and other objects in view, our invention consists in certain novel features of construction and arrangement of parts, hereinafter more fully described, claimed and illustrated in the accompanying drawings, in which—

Fig. 6 is a plan view partly in section of a modified form of the rocking bearing for one of the sections of the driving shaft.

Fig. 7 is an elevational view of this modified form of bearing.

Figure 1:
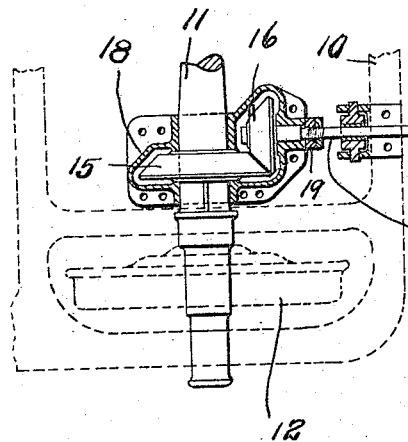
Figure 1 is a plan view of our improved driving means, with parts thereof in horizontal section.
Figure 2:
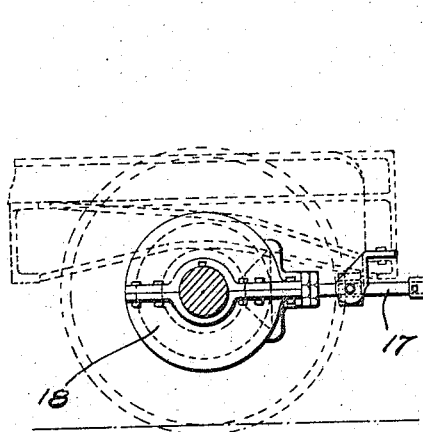
Fig. 2 is a side elevational view of the driving means.

Referring by numerals to the accompanying drawings, 10 designates the end rail of a car truck, 11 an axle, 12 one of the wheels carried by said axle, and 13 a generator support, preferably in the form of a bracket which is fixed to and depends from the underside of the car body. Supported by this bracket is a generator 14 of the type utilized in train lighting systems.

Fixed in any suitable manner to the car axle 11 is a driving wheel 15 having a beveled face and coöperating therewith is a smaller wheel or pinion 16 having a beveled face. The beveled faces of these wheels may be comparatively smooth and of the type generally utilized on coöperating friction gears, or said faces may be provided with teeth which readily mesh with each other. The smaller wheel or pinion 16 is fixed on one end of a section 17 of the driving shaft, said section having a bearing in the wall of a suitable housing 18 which incloses both driving wheels, and said housing being loosely mounted on the axle 11.

A portion of the section of shaft 17 immediately adjacent that portion which bears in the housing 18 is threaded and receives a pair of nuts 19 by means of which said section of shaft may be adjusted toward or away from axle 11, thereby adjusting the degree of frictional contact between wheels 16 and 18. After this adjustment has been accomplished, the section of shaft 17 can be locked against outward movement by tightening the outer one of said nuts 19 against the inner one.

Fixed to a portion of the car truck, preferably the end rail 10 is a bracket 20 provided with a pair of depending ears 21, the same being perforated as designated by 22 to receive the trunnions 23 on the ends of a rocking block 24. This block is provided with a centrally arranged opening 25, preferably bushed which receives the section of driving shaft 17. Thus said section of shaft can rotate freely and move lengthwise through block 24, and as the truck frame and axle move vertically in opposite directions with respect to each other, said block will rock on a horizontal axis formed by the trunnions 23 and bearings 22 to accommodate the vertical swinging movement to which the section of driving shaft 17 is subjected.

Connected to the outer end of shaft section 17 by a universal joint 26 is one end of a driving shaft section 27, the opposite end of which is connected by a universal joint 28 to a projecting end of the shaft 29 of the generator. Shaft section 27 is provided with a suitable extensible joint, preferably formed by a sleeve 30, which incloses a portion of the shaft section 27, and said sleeve and inclosed portion of the shaft having a pin and slot connection 31. If desired, this extensible joint may be formed by making the coöperating parts non-circular in cross section and fitted so as to slide or telescope with respect to each other.

The operation of our improved driving means will be readily understood, for as axle 11 rotates, its motion will be transmitted through coöperating driving wheels 18 and 16, to the flexible shaft comprising the parts 17 and 27, and such motion will be in turn transmitted to armature shaft 29.

Generator 14 being carried by the car body occupies a stable position, where it is unaffected by the constant vibration and service shocks ordinarily imparted to the truck frame while the car is in service, and the driving means being formed of shaft sections coupled by universal joints, will drive the armature of the generator in a direct and positive manner from the car axle.

The flexible and extensible driving shaft 27 operates positively under all conditions regardless of the relative vertical and horizontal movement between the car body and the truck and car axle, and by providing the rocking member 24, the driving shaft section 17 can change its vertical position during the vertical movement of the truck frame with respect to the car axle.

Figures 3, 4:
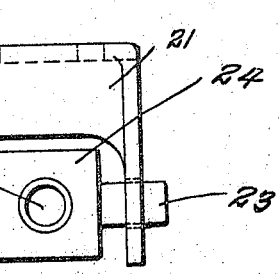
Fig. 3 is a side elevational view of a bracket and rocking bearing which is fixed to the truck frame and which supports a portion of the main driving shaft.
Fig. 4 is an elevational view of the bracket and rocking bearing.
Figure 5:
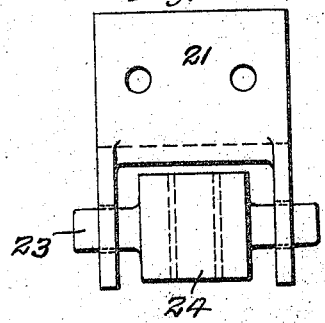
Fig. 5 is a plan view of the bracket and rocking bearing.

It will be noted by reference to Fig. 4, that there is considerable space between the sides of the rocking member 24 and the perforated ears 21, this space being provided in order to permit the relative lateral movement which occurs between the truck frame and wheel carrying axle.

In the modified construction illustrated in Figs. 6 and 7, the gear housing $18^a$ is provided with a tubular extension 32 which serves as a bearing for the section $17^a$ of the driving shaft, said tubular extension overlying the end rail of the car truck and being provided with laterally projecting trunnions 33, which occupy short horizontally disposed slots 34 formed in bearings 35, the same being fixed in any suitable manner to the end rail of the truck frame. The slots 34 in these brackets are of sufficient length to permit such vertical and horizontal movement as may take place between the truck frame and axle and the brackets 35 are located a sufficient distance away from the tubular member 32 so as to permit said truck frame and axle to move laterally with respect to each other.

The outer end of tubular member 32 is threaded and receives an adjusting nut 36 and a lock nut 37, said adjusting nut being provided with a tubular inner portion 38 which is preferably bushed and serves as a bearing for shaft section $17^a$ and the inner end of this tubular portion normally bears against a shoulder 39 formed on said shaft section. Such construction permits the beveled pinion on the end of shaft section $17^a$ to be adjusted toward the coöperating beveled wheel carried by the axle and by tightening nut 37, the parts can be locked after such adjustment.

Inasmuch as the tubular member 32 extends over and beyond the end rail of the truck frame, the adjustment just referred to can be conveniently made from a point outside said truck frame.

Our improved construction wholly eliminates belts and driving chains, which latter, it will be understood, are a source of considerable trouble and expense in train lighting systems utilizing axle driven generators, and by providing a rocking bearing for one of the sections of the driving shaft and arranging the supports so that said rocking bearing can move laterally for a limited distance, said driving means will operate in the desired manner, regardless of the relative vertical and horizontal movements which necessarily take place between the car body, the truck and the axle.

Further our improved construction can be easily and cheaply installed, is positive and effective in operation, and permits the generator to be located at the logical point, viz., on the body of the car.

It will be readily understood that minor changes in the size, form and construction of the various parts of our improved generator can be made and substituted for those herein shown and described, without departing from the spirit of our invention, the scope of which is set forth in the appended claims.

We claim:

1. The combination with a truck frame and axle and the generator of a train lighting system, of a sectional driving shaft, one end of which is connected to the armature shaft of the generator, driving means between the axle and the other end of said sectional shaft, a bracket rigidly fixed to the truck frame, a bearing pivotally mounted in said bracket, one of the sections of the driving shaft being mounted for sliding movement through said bearing and one of the sections of said driving shaft being provided with an extensible joint.

2. The combination with a truck frame and axle and the generator of a train lighting system, which generator is carried directly by the car body, of a driving shaft formed in sections, the ends of which sections are connected by universal joints, one of said sections being connected to the armature shaft of the generator, one of the sections being provided with an extensible joint, means for driving said shaft directly from the axle, a bracket rigidly fixed on the truck frame, a bearing block in which one of the sections of the driving shaft is mounted for sliding movement, and trunnions on said bearing block, which trunnions are journaled in said brackets.

In testimony whereof we hereunto affix our signatures, in the presence of two witnesses, this 11th day of July, 1916.

MAXIMILIAN P. NEUMAYER.
MAXIMILIAN J. NEUMAYER.

Witnesses:
   JOHN B. THRO,
   ADOLPH THRO.